April 5, 1949.  C. SURICO  2,466,130
PROCESS AND APPARATUS FOR DRYING MATERIALS
Filed Jan. 11, 1945  4 Sheets-Sheet 4

Inventor
Carmine Surico
by his Attorney
Emanuel Scheyer

Patented Apr. 5, 1949

2,466,130

UNITED STATES PATENT OFFICE 2,466,130

PROCESS AND APPARATUS FOR DRYING MATERIALS

Carmine Surico, New York, N. Y.

Application January 11, 1945, Serial No. 572,269

3 Claims. (Cl. 34—203)

This invention relates to a drier and a process for drying material, such as chemicals and foods, especially those which are made up of a multitude of pieces that are plastic or soft when moist and relatively stiff when dry, as dough products such as noodles and macaroni both long and short cut. The term "moist" is used in a broad sense, as it may mean the presence of other liquids than water.

It is an object of the process and apparatus to dry the material, especially a dough product, without subjecting it to deterioration in color, texture and shape. The process and apparatus will be described in connection with a dough product, such as short cut macaroni, but they will be suitable for use with other material of the character described above. Unless dried slowly, material such as macaroni will check and otherwise deteriorate.

The short cut macaroni after it leaves the press, where it is formed and cut to size is sent to a collector or shaker where it is rapidly shaken back and forth and subjected to a chilling and slight drying. The shaking also causes the pieces of macaroni to be rolled about. The collector step in the process is necessary to prevent the macaroni, which is very soft and moist when it leaves the press, from losing its shape by the time it reaches the preliminary drier, the material being sent from the collector to said drier. In the preliminary drier, the material is conveyed back and forth on endless foraminous or screen belts and subjected at the same time to the drying action of a draft of air. The preliminary drier effects a quick drying of the material, so that its pieces become stiff enough not to crush and stick together. The air in the preliminary drier is kept at a relatively high temperature, 110 to 120 degrees with a very low moisture content. The material is thinly spread on the conveyers, except on the last in one form of preliminary drier. In this form the material is packed thick on the last conveyer so that it receives its first sweat here. From the preliminary drier, the material is sent to the finish or final drier. The latter differs from the preliminary drier in that it is arranged to subject the material a plurality of times to alternate steps of drying and sweating. Upon entering the finish drier, the material receives first a quick drying, which dries the material at its surface and stiffens it there into a shell. The shell so formed helps to keep the shape and color of the material during the rest of the drying process. Then to get rid of the moisture in the interior of the material, temporarily imprisoned therein by the shell, the material is sweated by keeping it in dead air, which allows the interior moisture to creep out to the surface. The sweating noted above for the last step in the preliminary drier acts in the same way. After the initial sweating in the final drier, further drying of the material is necessary. In my Patent No. 2,259,963 Oct. 21, 1941, the drying, after its first sweating, such as noted above for the preliminary drier, is effected by passing the material on conveyers back and forth a number of times through a drying chamber where it is gradually, evenly and uniformly dried. The machine illustrated in the patent requires for such drying from about 18 to 20 hours and requires careful watching to see that the drying goes along properly.

In the present invention, the time for drying is materially reduced, requiring only about 12 to 14 hours for short cut macaroni. Instead of using the gradual final drying described in the patent after the first sweating, my present invention subjects the material again to drying for case hardening. After the second drying, the material is again sweated. Next a drying step is used and so on, alternating drying steps with sweating steps until the material is sufficiently dried. In the final drier, the temperature is less than in the preliminary drier, about 90 to 95 degrees F., with moisture corresponding to 80 to 85 degrees F. on the wet bulb and with mild air circulation. It is an essential feature of my process, whether all the steps take place in the final drier, or between the preliminary drier and the final drier, that the material is subjected to repeated alternate drying and sweating until all or a predetermined amount of moisture is removed. With short cut macaroni, it is preferred to have about 12½% or 13% of moisture still remaining when the product leaves the final drier.

In the prior art the practice has been after final drying to let the product stand a day or so for annealing. But with my new process the product after being mixed up is delivered to an annealing unit which comprises a plurality of foraminous or screen conveyers on which the macaroni is piled very thick, about 12 to 14 inches with the air in the unit at a temperature of 80 to 85 degrees F. and with moisture corresponding to 70 to 75 degrees on the wet bulb with a milder air circulation than in the final drier. The annealing step in my process takes about three hours.

Means are provided between the discharge end of the preliminary drier and the receiving end of the final drier for a mixing up of the product. Similar means are provided between the discharge end of the final drier and the annealing unit. Such means are necessary, otherwise the product in passing from one conveyer to the next would always remain in the same relative position on the conveyer, those pieces on the sides thus becoming drier than those in the middle. A similar condition tends to occur for the positions of the pieces in the depth of the pile on the conveyers as it varies from thick to thin. Some pieces would be too wet and others too dry. Even with the mixing noted, there remains a certain amount of lack of uniformity in the relative dryness of one piece to another and in the parts of the piece itself. The latter condition induces internal stress in the piece, which if not removed may cause it to lose its shape and even to crack.

In the annealing unit, by the slow movement of the product in the atmospheric conditions maintained in the unit and due to the fact that the product has been all mixed up and piled in thick layers, a give and take of moisture from one piece to the other and within the pieces takes place resulting in an equalization of moisture among the several pieces and uniformity of moisture within the pieces. When the product leaves this unit substantially all the internal stress is removed from the individual pieces and every piece has substantially the same amount of moisture as the other. The product is then considered to be annealed and ready for packing.

It will be understood that considerable variation is possible and still be within the scope of the invention, in temperature range, moisture conditions, speed of drying, the number of conveyers used and the number of successive alternations of sweat and drying steps.

Other objects and advantages will become apparent upon further study of the description and drawings, in which:

Fig. 5 is a diagrammatic plan of the cross or mixing conveyers, funnel and a portion of the discharge or sweat conveyer of the preliminary drier.

By way of example, the process and apparatus will be described in connection with short cut macaroni.

Figure 1:
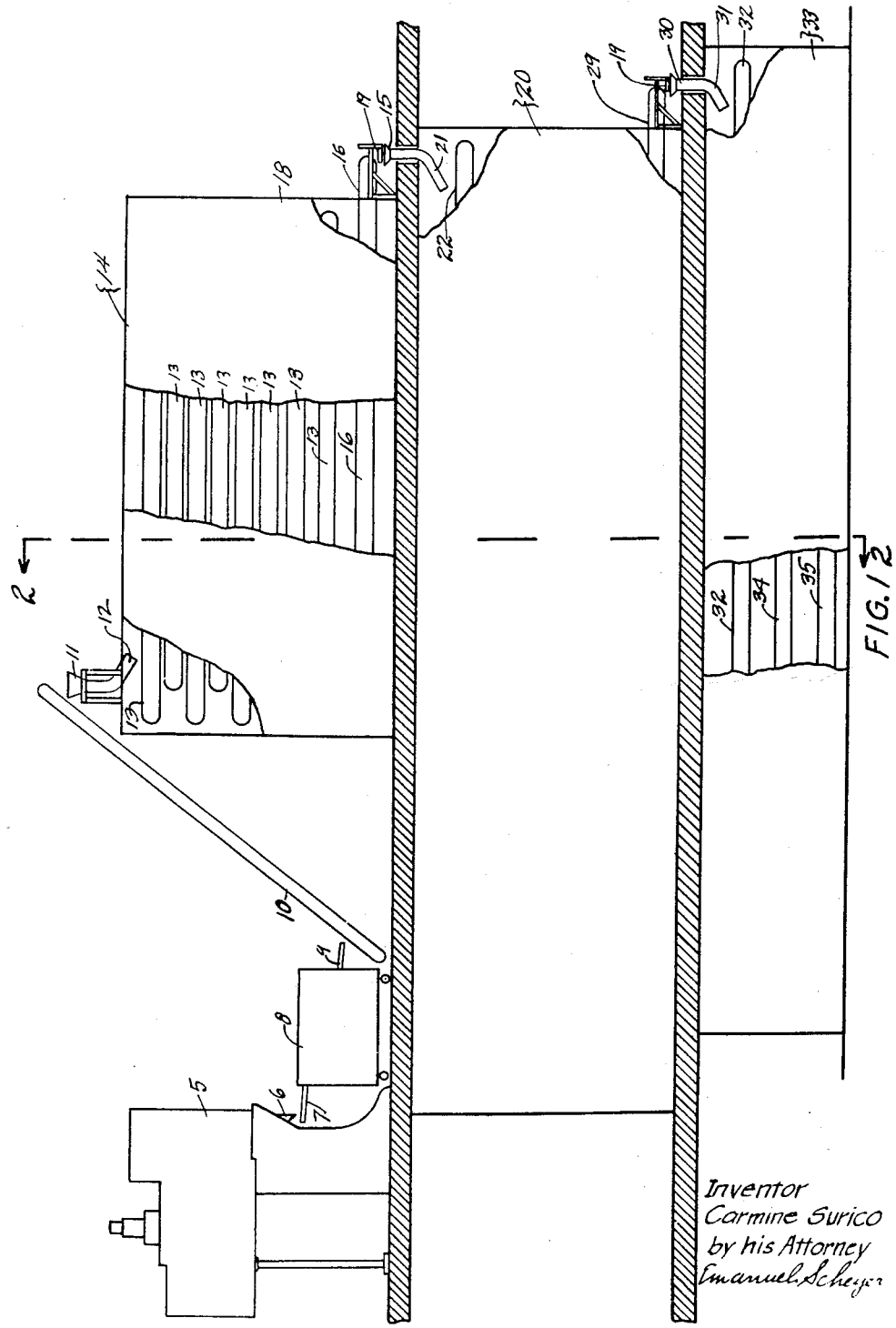
Fig. 1 is a diagrammatic longitudinal elevation of the apparatus required for the process with parts broken out to show the interior, parts of the funnel mechanism being omitted, and the temperature and humidity control doors and heaters omitted.
Figure 2:
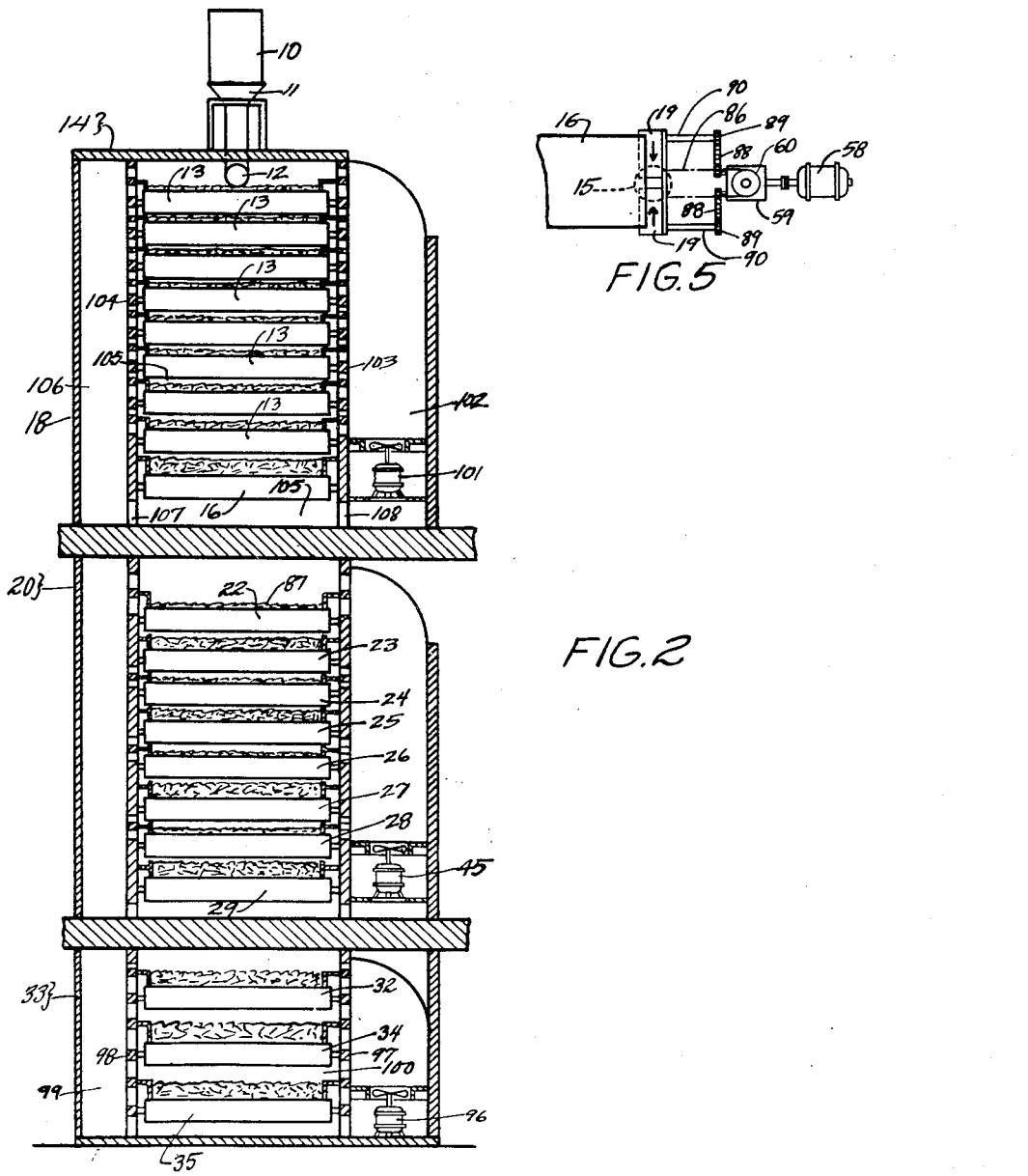
Fig. 2 is a cross section taken along the line 2—2 of Fig. 1 and shows the layers of material on the conveyers. The details of the funnel mechanism are omitted.
Figure 3:
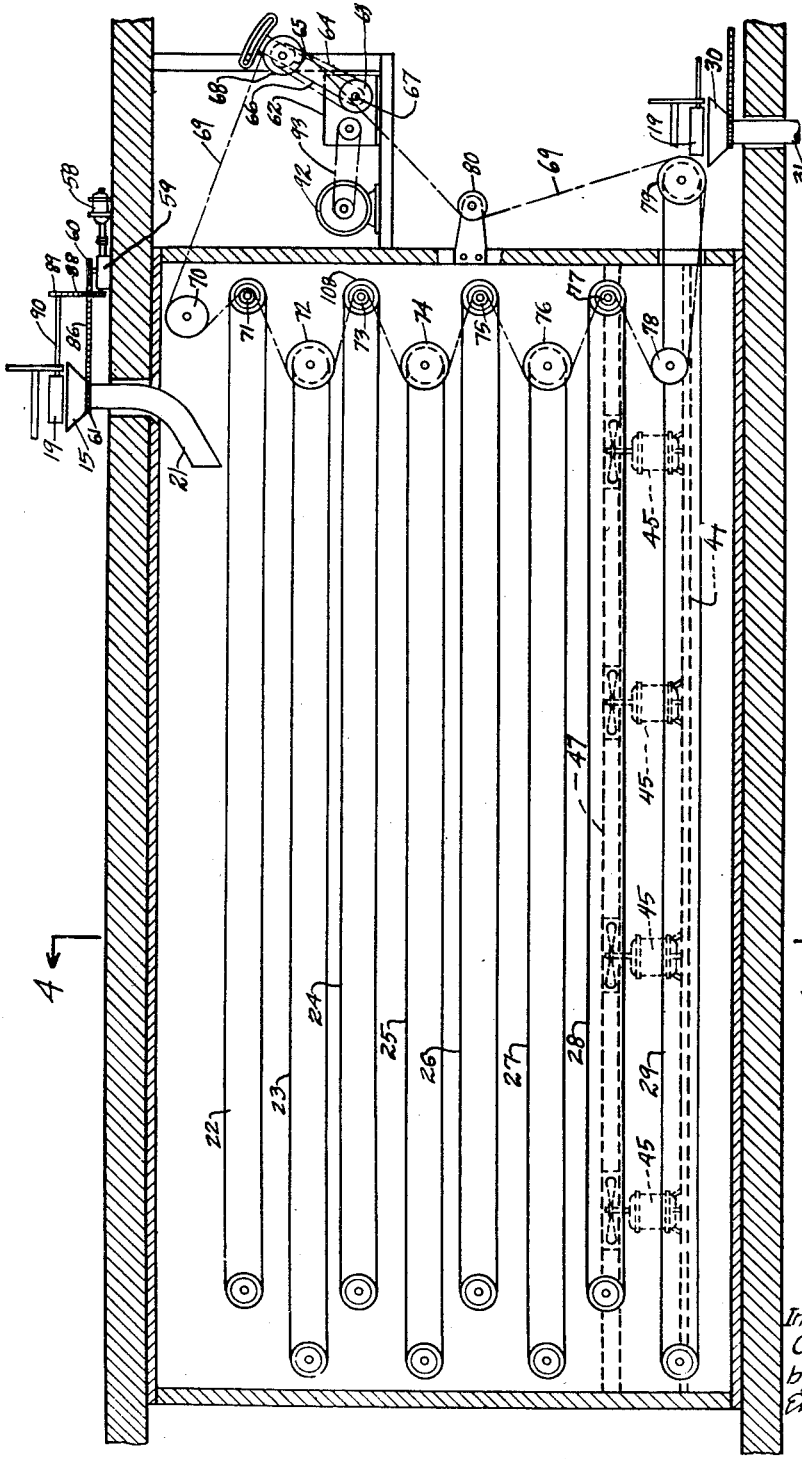
Fig. 3 is a longitudinal section of the finish or main drier, portions at the funnels of the framing and mechanism at the cross feed or mixing conveyers being omitted.

The macaroni leaves short cut press 5 by chute 6 from whence it falls on tray 7 of the collector or shaker 8. Inside shaker 8, as was noted before, the material is shaken and rolled and subject to slight drying. It takes about five minutes for the material to travel through the shaker, inside of which the air is changed every four or five minutes. The collector or shaker, which in itself is well known to the art, consists of a set of trays, not shown, one above the other which are shaken back and forth, the material dropping down from one tray to the next one below, until it is shaken off bottom tray 9 onto endless conveyer 10. The latter discharges the macaroni at its top into rotating funnel 11. A spout 12 which rotates with the funnel 11, spreads the macaroni on top conveyer 13 of preliminary drier 14. The mechanism for rotating funnel 11 and spout 12 is not shown but it is similar to that shown for funnel 15 at the top of Fig. 3 which will be described later.

Preliminary drier 14 consists of a plurality of drying conveyers 13, one above the other and at the bottom sweat conveyer 16, all mounted inside the conveyer chamber 105 of housing 18. The material is passed down from one conveyer to the next and out of housing 18 of the preliminary drier by the projecting end of sweat conveyer 16. Temperature and moisture conditions maintained inside of housing 18 have already been described.

When the material drops off conveyer 16, some of it falls on transversely running mixing conveyers 19, Fig. 5, and some of its falls through the space between the inner ends of said conveyers directly into funnel 15. Mixing conveyers 19 are provided so that the pieces of the material running on the conveyers in preliminary drier 14 are completely displaced with respect to each other by the time they reach conveyers of the finish drier. Mixing conveyers 19 see to it that the pieces of the material which are running near the edges of conveyers 13 and 16 are brought toward a central position before reaching funnel 15, further mixing being effected by the rotation of said funnel and of its spout 21.

The material 87 in leaving rotating spout 21 is spread across the width of top drying conveyer 22 of finish drier 20. The material is then fed from the end of conveyer 22 onto sweat conveyer 23, from there to drying conveyer 24 passing down consecutively to sweat conveyer 25, drying conveyer 26, sweat conveyer 27, drying conveyer 28 and finally onto sweat conveyer 29 at the bottom. The material is then fed by the projecting end of conveyer 29 onto mixing conveyers 19 and into rotating funnel 30 whose spout 31 spreads it on top conveyer 32 of annealing or equalizer unit 33. After passing over the successive conveyers 32, 34 and 35 of the equalizer, the material is ready for packaging.

The construction of the finish or main drier 20 will now be described in more detail. It is to be understood that this construction also applies to the preliminary drier and the equalizer as far as the drive of the conveyers, the temperature and humidity control, and the chambers and air circulation therein are concerned.

Figure 4:
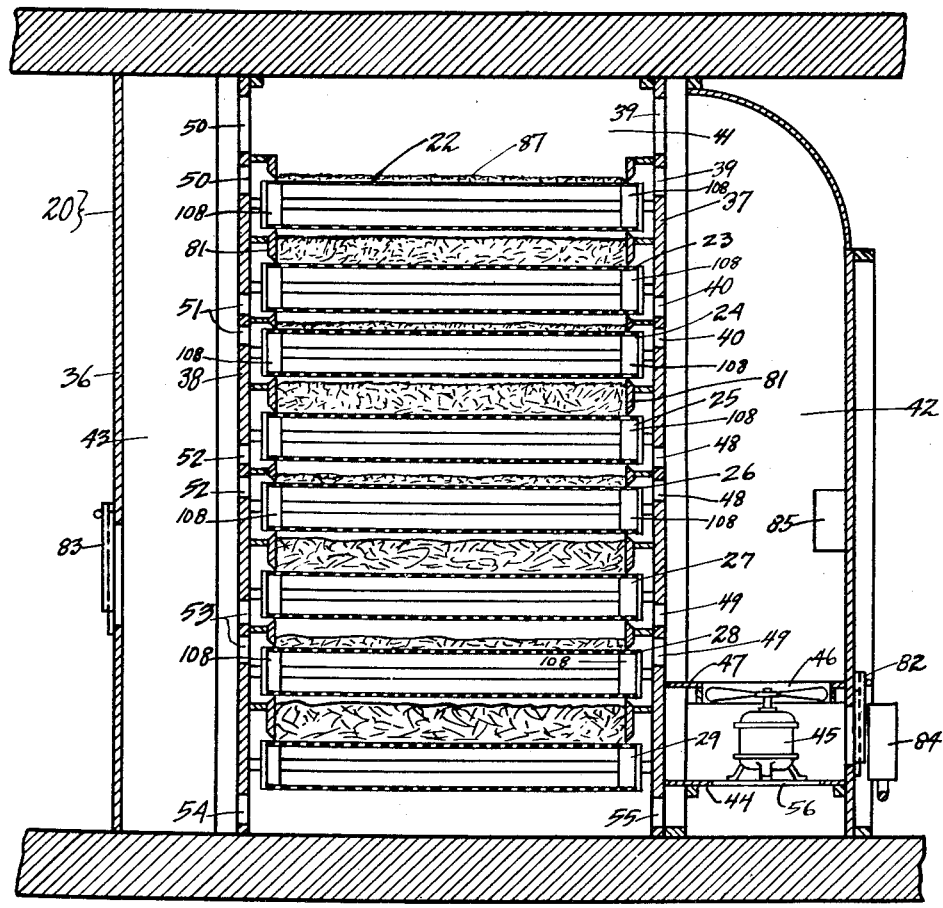
Fig. 4 is a cross section of the finish or main drier taken along the line 4—4 of Fig. 3 and shows the layers of material.

The space enclosed by housing 36, Fig. 4 is divided into three chambers by partitions 37 and 38, a front chamber 42, a middle or conveyer chamber 41 and a rear or air return chamber 43. At the lower part of chamber 42 is a shelf 44 which supports a row of motor fans 45, the blade portions of which operate in openings 46 provided in partition 47. Air is forced upward into chamber 42 by fans 45. From chamber 42, the air passes laterally through openings 39, 40, 48 and 49 into middle chamber 41, through openings, not seen, provided in supporting spools 108 of the conveyers, the open mesh of the conveyer runs under, over and through the layer of material spread on the drying conveyers 22, 24, 26, and 28, across the middle chamber 41, out openings 50, 51, 52 and 53 into air return chamber 43 from whence it is drawn through openings 54 in partition 38, across the bottom of middle chamber 41 through openings 55 in front partition 37, up through openings 56 in shelf 44 and forced by fans 45 through openings 46 back into chamber 42 from whence it is sent on its circuit again and so on. It is to be noted that the runs of the conveyers are of open mesh for the passage of air through them.

In order to regulate the amount of fresh air taken into the circulation, vertically sliding doors 82 are provided at openings in the front wall of housing 36 and vertically sliding doors 83 are provided at openings in the rear wall of housing 36. Further to furnish heat to the air entering the system through doors 82, steam radiators 84 are provided at the openings at doors 82. Instrument panel 85 of a wet and dry bulb control is located in chamber 42 for controlling the moisture and temperature of the air in the drier. Such control is well known to the art. By means of the control, the amount doors 82 and 83 are opened is regulated.

The material to be dried, such as short cut macaroni 87, drops off conveyer 16 of the preliminary drying unit 14 onto mixing conveyers 19 and into funnel 15 and is distributed by spout 21 on top conveyer 22. Funnel 15 and with it spout 21 are rotated, Figs. 3 and 5, by means of motor 58, gear reducing box 59, sprockets 60 and 61 and chain 86 running over said sprockets. Chains 88, Fig. 5, operated by gear reducing box 59, rotate sprockets 89 on shafts 90, the latter causing mixing conveyers 19 to travel in opposite directions as shown by the arrows. Because conveyer 22 runs relatively fast to the rate that the macaroni 87 is fed to it by spout 21, the macaroni is spread in a thin layer on the conveyer, allowing the air to reach readily the individual pieces for quick case hardening. When macaroni 87 reaches the left end of conveyer 22, a drying conveyer, it falls off onto sweat conveyer 23. The latter moves relatively slowly so that the macaroni piles up in a thick layer upon it. The presence of a thick layer in the space between conveyers 22 and 23 coupled with the absence of openings in partitions 37 and 38 opposite said space, blocks off the air flow through said space, causing a region of dead air therein. In their relatively slow passage through the dead air region or space, the pieces of macaroni sweat, that is the imprisoned moisture in their interior creeps to the surface from whence it can be readily evaporated when it reaches conveyer 24 just below. When the material reaches the right end of conveyer 23 it spills onto drying conveyer 24 which is geared to run relatively fast so that the material is again spread out in a thin layer, this time not quite as thin as the layer on conveyer 22. Air flows across the space in the vicinity of the layer on conveyer 24 entering through openings 40 and leaving through openings 51. On conveyer 24 the pieces are again case hardened, that is having a relatively hard shell formed on their outside, but with less imprisoned moisture in their interior than after the first case hardening. From conveyer 24 the material passes down to the relatively slow moving conveyer 25, the material again being piled in a thick layer, this time somewhat thicker than what it was on sweat conveyer 23. No openings are present in partitions 37 and 38 opposite the layer on conveyer 25, causing together with the blocking action of a thick layer another dead air zone through which the material is slowly passed. In its passage through the latter dead air zone, moisture in the interior of the pieces creeps to their surface where it is ready to be evaporated by the air flowing by conveyer 26. When the material reaches the end of conveyer 25 it drops down to drying conveyer 26 where the moisture that has crept to the surface of the pieces is removed. Each time these steps are repeated there is less moisture in the piece to be removed. From conveyer 26, the material drops down for further sweating to conveyer 27 upon which it is piled thick, thicker even than on conveyer 25. From conveyer 27, the material passes down for another drying step to conveyer 28 where it is spread thin but not so thin as on conveyer 26. From conveyer 28, the material drops down for a final sweating to conveyer 29 where it is spread in a layer thicker than on conveyer 27. It is to be noted that the material is spread in gradually increasing thickness of layers on subsequent drying conveyers and on subsequent sweat conveyers because the product becomes more dried as it goes from one conveyer to the next. The material is kept from spilling sideways from the conveyers by guides 81 on each side.

The material spills off from conveyer 29 to mixing conveyers 19 and funnel 30 from whence it is spread by spout 31 on the top conveyer 32 of equalizer 33. It has been found necessary to mix the product twice, as by the mixing conveyers 19, funnel 15 and spout 21 at the entrance to the finish drier, and by mixing conveyers 19, funnel 30 and spout 31 at the discharge from the finish drier. This ensures that the pieces that were on the sides of the drying and sweat conveyers and those that were at the center do not retain their relative positions throughout the drying process.

The runs of the conveyers in the finish drier 20 pass over spools 108 which are rotatably mounted in partitions 37 and 38. These conveyers are driven by motor 92, which by means of belt or chain 93 operates gear box 62. Sprocket 63 on box 62 operates belt or chain 64 which drives sprocket 65 rotatably mounted on belt tightening lever 66, the latter being pivotally mounted on a pivot 67. Coaxially mounted on lever 66 with sprocket 65 is sprocket 68 which engages the main driving belt or chain 69. From sprocket 68, chain 69 passes over idler sprocket 70, sprocket 71 on conveyer 22, sprocket 72 on conveyer 23, sprocket 73 on conveyer 24, sprocket 74 on conveyer 25, sprocket 75 on conveyer 26, sprocket 76 on conveyer 27, sprocket 77 on conveyer 28, idler sprocket 78, sprocket 79 on conveyer 29, idler sprocket 80 back to sprocket 68. The chain 69 so passes over the various sprockets, that successive conveyers on the way down are driven in opposite directions, the smaller sprockets being on conveyers 22, 24, 26 and 28 which carry the product accordingly faster and in thinner layers for drying than on the sweat conveyers 23, 25, 27 and 29.

Going back now to the equalizer or annealing unit 33, the material is spread in a thick layer on conveyer 32 by spout 31. From conveyer 32 the material is passed on down successively to conveyers 34 and 35 on both of which it is piled in a thick layer. The layers on all three conveyers are preferably 12 to 14 inches thick. The speed of the conveyers is such that it takes about three hours for the product to pass through the unit. Of course it will be understood, considerable variation in the thickness of the layers and the time for passage can be had and still effect the proper annealing or equalization of the moisture among the pieces of the product and the even distribution of the residual moisture within the individual pieces to avoid internal or locked in stress in them. Equalizer 33 is provided with a similar temperature and humidity control, not shown, as was described above for finish drier 20. Also the mechanism for driving the conveyers, not shown, is similar to that described for the finish drier. The air circulation is effected by fans, one of which is shown at 96, which sends the air through openings in partition 97 across middle chamber 100 and the conveyers, through openings in partition 98 into air return chamber 99 and back across the bottom of middle chamber 100 to fans 96.

Preliminary drier 14 is provided with a similar temperature and humidity control, not shown, as was described for finish drier 20. Also the mechanism for driving the conveyers, not shown, is similar to that described for the finish drier. The air circulation is effected by fans, one of which is shown at 101, which sends the air from front chamber 102, through openings in partition 103 across middle chamber 105 and conveyers 13, but not across bottom conveyer 16 which is a sweat conveyer. From middle chamber 105, the air enters air return chamber 106, through openings in partition 104, returning through openings 107 at the bottom of partition 104, across middle chamber 105 and out openings 108. It is to be noted that there are no openings in partitions 103 and 104 opposite conveyer 16. This is a relatively slow moving conveyer having the material piled in a thick layer upon it, which, together with the lack of openings in partitions 103 and 104 blocks the circulation of air, so that there is a dead air region about said thick layer to induce sweating.

The number of conveyers and their alternate types, that is their relative speed and lack or presence of air circulation may be varied to suit the material and conditions in constructing the apparatus and in performing the process. In arranging for the alternation of the sweat and drying steps, there may be one or more conveyers used for each individual step. Further, the means to send the material through the units need not necessarily be endless belt conveyers as in the particular embodiment illustrated. Other types of conveying means are well known to the art.

In the particular embodiment illustrated, the material passed from one unit to the next by gravity after it reached the preliminary drier, but it will be understood that other means, such as buckets, elevator belts or blowers could be used for the transfer of the material.

I claim:

1. A drier comprising a chamber, said drier being for material of the character described, a plurality of conveyers mounted in the chamber one above the other, means for moving some of the conveyers faster than others, slow moving conveyers alternating with fast moving ones, means for feeding the material to the top conveyer, the material feeding down from one conveyer to the next lower one, means for circulating air of predetermined temperature and humidity through the chamber, the material being spread in a thin layer on the fast moving conveyers and in a relatively very thick layer on the slow moving conveyers, there being a plurality of alternations of fast and slow moving conveyers, enough alternations being provided to make the material substantially dry, and baffle means cooperating with the thick layers for blocking the circulation of air adjacent the slow moving conveyers.

2. A drier comprising a housing enclosing a chamber, said drier being for material of the character described, a plurality of substantially horizontally running conveyers in the chamber occupying successive vertically disposed spaces therein, the conveyers having upper and lower runs, means for longitudinally running through the chamber some of the conveyers faster than others, slow moving conveyers alternating with fast moving ones, means for feeding the material to the first of the conveyers, the material being fed from one conveyer to the next below, means for circulating air of predetermined temperature and humidity through the chamber, the material being spread in a thinner layer on the upper run of the fast moving conveyers than on the upper run of the slow moving conveyers due to their difference in speed, the relative thickness of the layers being in accordance with the relative speeds of the conveyers, there being a plurality of alternations of fast and slow moving conveyers, enough alternations being provided to make the material substantially dry, said chamber being provided with inlets on one side of the fast moving conveyers substantially adjacent their upper runs, and with outlets on the opposite side of the fast moving conveyers substantially adjacent their upper runs for circulation of air across the chamber opposite the upper runs of the fast moving conveyers and baffle means hindering the circulation of air across the chamber opposite the upper runs of the slow moving conveyers.

3. A drier comprising a housing enclosing a chamber, said drier being for material of the character described, a plurality of conveyers in the chamber, power driven means constructed to move some of the conveyers faster than others with slower moving conveyers alternating with faster moving ones, there being a plurality of alternations of faster with slower moving conveyers, means for feeding the material to the first of the conveyers, said conveyers being arranged to have the material feed through the chamber from one conveyer to the next, the material thereby being spread in a thinner layer on the faster moving conveyers than on the slower moving ones, said power driven means being suitably constructed to run the successive faster moving conveyers at successively less speed as well as to run the successive slower moving conveyers at successively less speed, thereby successively increasing the thickness of the layers deposited on the successive faster moving conveyers as well as on the successive slower moving conveyers, means for circulating air of predeter- ..ined temperature and humidity through said chamber, the latter having air inlets and air outlets suitably located with respect to the conveyers to direct the air to pass in materially greater volume past the thinner layers than past at the thicker layers, enough alternations of faster with slower moving conveyers being provided to produce enough alternations of thinner with thicker layers to make the material substantially dry.

CARMINE SURICO.

REFERENCES CITED

The following references are of record in the file of this patent:

UNITED STATES PATENTS

| Number | Name | Date |
|---|---|---|
| 1,284,305 | Gammel | Nov. 12, 1918 |
| 1,551,818 | Garnsey | Sept. 1, 1925 |
| 1,567,031 | Buensod | Dec. 29, 1925 |
| 1,915,648 | De Reamer | June 27, 1933 |
| 1,976,280 | Fischer | Oct. 9, 1934 |
| 2,074,458 | Cavagnaro | Mar. 23, 1937 |
| 2,259,963 | Surico | Oct. 21, 1941 |